(12) United States Patent
Simeonidou et al.

(10) Patent No.: US 6,249,620 B1
(45) Date of Patent: Jun. 19, 2001

(54) RECONFIGURABLE BRANCHING UNIT FOR A SUBMARINE COMMUNICATIONS SYSTEM

(75) Inventors: Dimitra Simeonidou, Purley; Christina Long, Durham, both of (GB)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/233,125

(22) Filed: Jan. 19, 1999

(30) Foreign Application Priority Data

Jan. 20, 1998 (GB) .................................................. 9801183

(51) Int. Cl.⁷ ...................................................... G02B 6/35
(52) U.S. Cl. ................................ 385/16; 385/24; 359/128
(58) Field of Search ................................. 385/15–23, 24; 359/128

(56) References Cited

U.S. PATENT DOCUMENTS

| | | | |
|---|---|---|---|
| 5,414,548 | * 5/1995 | Tachikawa et al. | ............... 359/130 |
| 5,612,805 | 3/1997 | Fevrier et al. | |
| 5,771,112 | * 6/1998 | Hamel et al. | ............... 359/128 |

FOREIGN PATENT DOCUMENTS

| | | |
|---|---|---|
| 0 666 485 A1 | 8/1995 | (EP) . |
| 0 699 927 A1 | 3/1996 | (EP) . |
| 0 720 408 A2 | 7/1996 | (EP) . |
| 007200408 A1 | 7/1996 | (EP) . |
| 0 750 409 A1 | 12/1996 | (EP) . |
| WO 97/06617 | 2/1997 | (WO) . |

OTHER PUBLICATIONS

Simeonidou, D. et al.; "Submerged WDM Network Implementation Using All Optical Wavelength Routers" WDM Technology and Applications (Digest No. 1997/036), IEE Colloquium on, 1997 pp. 5/1–5/5.*

Ishida, O. et al.: "Multichannel Frequency–Selective Switch Employing an Arrayed–Waveguide Grating Multiplexer with Fold–Back Optical Paths" IEEE Photonics Technology Letters, vol. 6, No. 10, Oct. 1, 1994, pp. 1219–1221, XP000476947.

Tachikawa Y. et al.: "Arrayed–Waveguide Grating Multiplexer with Loop–Back Optical Paths and Its Applications" Journal of Lightwave Technology, vol. 14, No. 6, Jun. 1, 1996, pp. 977–984, XP000598501.

* cited by examiner

Primary Examiner—Rodney Bovernick
Assistant Examiner—Sarah N. Song
(74) Attorney, Agent, or Firm—Sughrue, Mion, Zinn, Macpeak & Seas, PLLC

(57) ABSTRACT

The invention relates to a branching unit (7) for an underwater wavelength division multiplexed (WDM) optical communications system. The branching unit (7) has an optical switch (16) and an optical multiplexer (17) having a number of loop back optical paths which pass through the switch (16). The optical switch (16) is reconfigurable so that individual channels of a WDM signal can be selectively coupled to a trunk output of the branching unit (7). The branching unit allows wavelength and/or capacity reconfiguration between the main trunk (4) and the spur (8) so that it is possible to disconnect a signal from the spur or increase capacity of the spur according to customers' changing requirements.

6 Claims, 2 Drawing Sheets

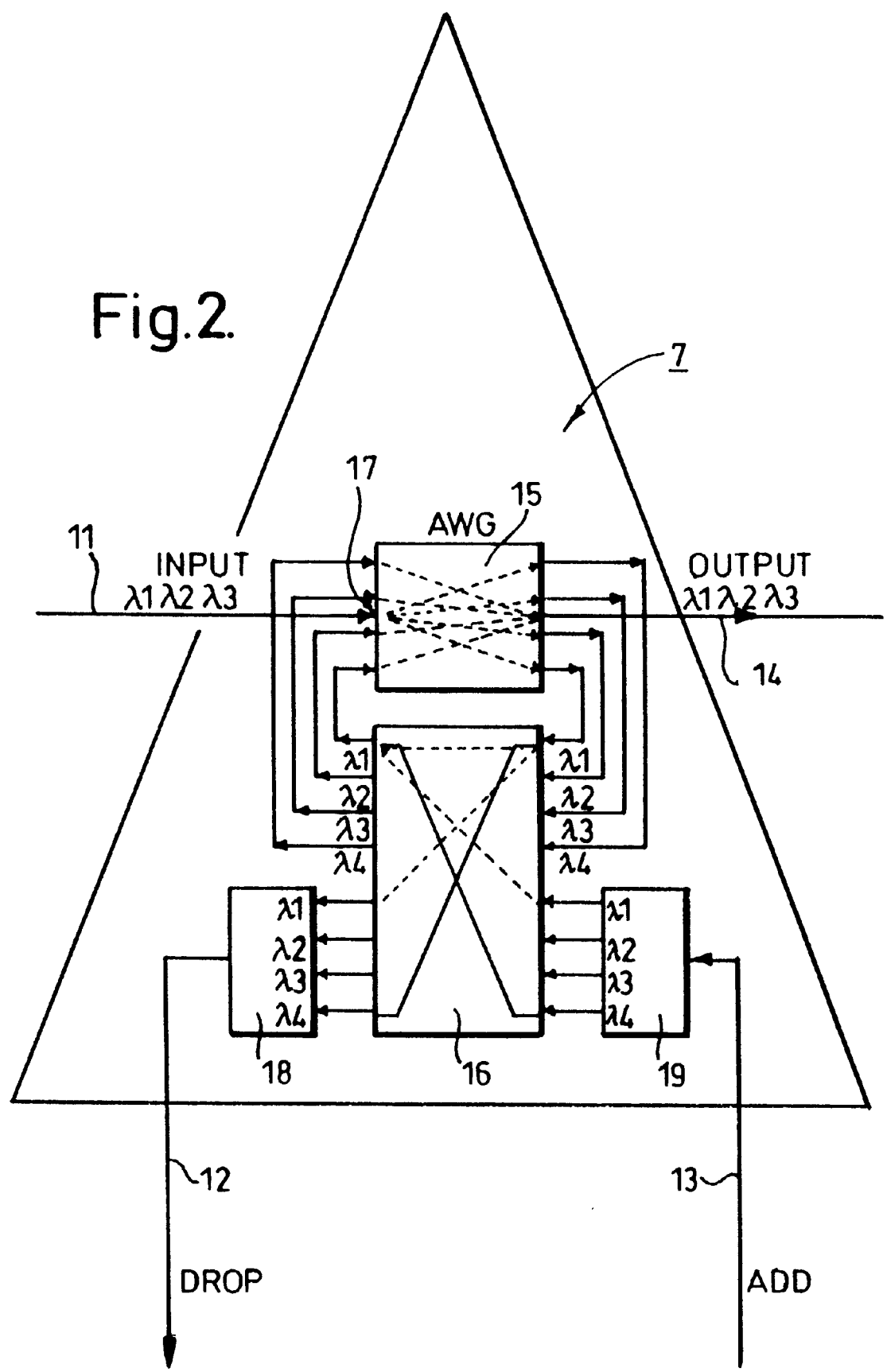

RECONFIGURABLE BRANCHING UNIT FOR A SUBMARINE COMMUNICATIONS SYSTEM

FIELD OF THE INVENTION

The present invention relates to a branching unit for an underwater optical communications system which carries wavelength division multiplexed (WDM) signals.

BACKGROUND TO THE INVENTION

Current branching unit designs for all WDM submarine communications systems use optical gratings as filters which only add or drop specific wavelengths and so do not allow wavelength or capacity reconfiguration between the trunk and the spur. In particular, it is not possible to disconnect a signal channel from the spur or increase the capacity of the spur by the addition of further channels.

SUMMARY OF THE INVENTION

According to a first aspect of the present invention, a branching unit for an underwater optical communications system comprises an optical switch and an optical multiplexer, the optical multiplexer having a number of loop-back optical paths which pass through the optical switch, wherein the optical switch is reconfigurable by changing the state of the optical switch so that individual channels of a multichannel optical signal received at a trunk input of the branching unit can be selectively coupled to a spur output and optical channels of a signal received at a spur input of the branching unit can be selectively coupled to a trunk output.

Preferably, the branching unit further comprises a demultiplexer in a spur input path coupled to the optical switch for demultiplexing an optical signal from the spur input and directing individual channels to a respective input port of the optical switch.

Preferably, the branching unit further comprises a multiplexer in a spur output path coupled to the optical switch for combining individual channels from respective output ports of the optical switch and coupling the resultant multiplexed optical signal to the spur output.

Preferably, for a communications system which can carry an n-channel WDM optical signal, the optical switch is a 2nx2n optical switch. Preferably, the optical multiplexer comprises an arrayed-waveguide multiplexer.

According to a second aspect of the present invention, a communications system comprises a number of branching units in accordance with the first aspect of the present invention.

BRIEF DESCRIPTION OF THE DRAWINGS

An example of the present invention will now be described with reference to the accompanying drawings, in which.

DETAILED DESCRIPTION

Figure 1:
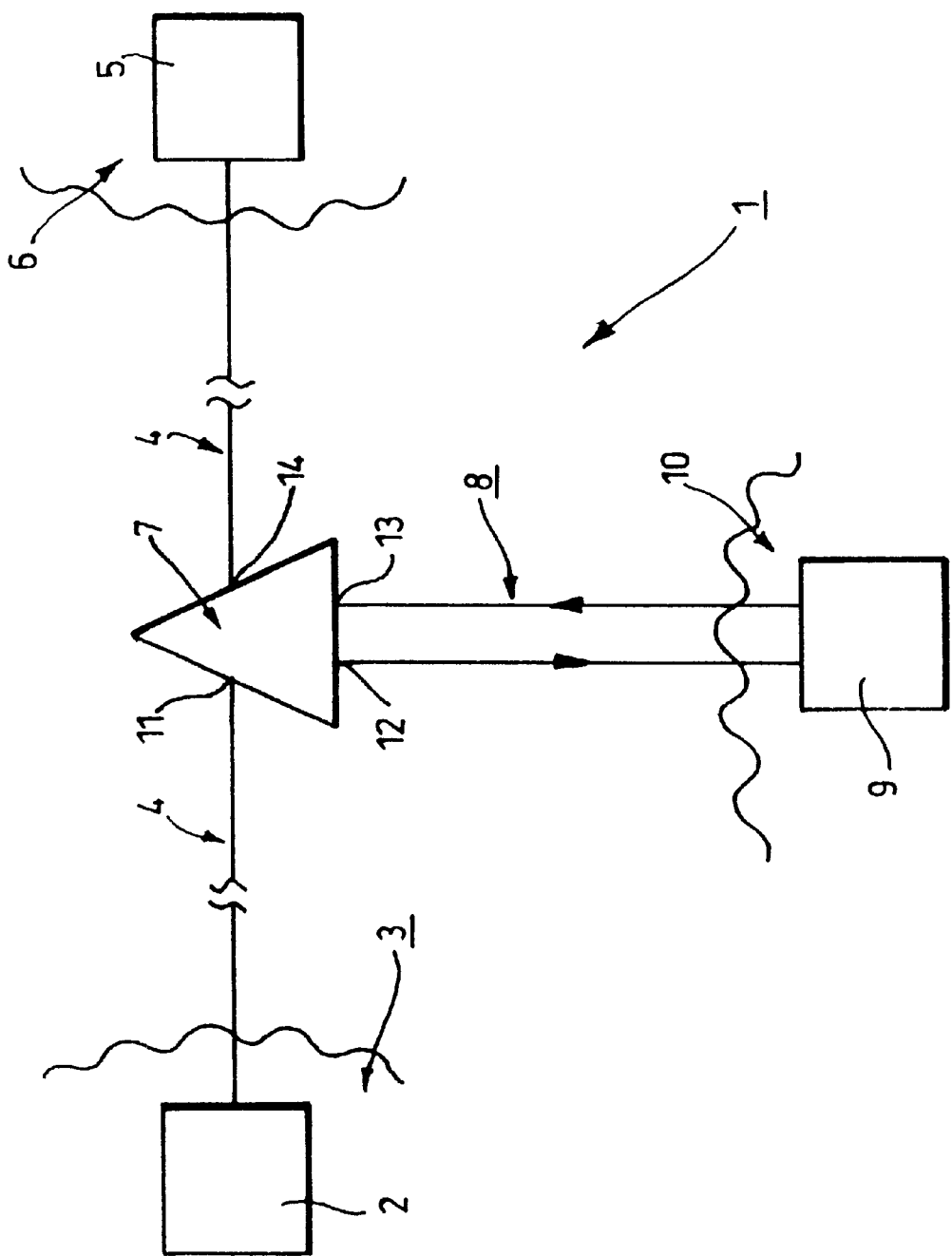
FIG. 1 is simplified schematic illustration of a submarine communications system; and, FIG. 2 is a simplified block diagram of a branching unit in accordance with the present invention.

FIG. 1 shows a simplified example of a submarine communications system 1 comprising a first end station 2 situated on a land mass 3 which communicates via an optical submarine cable (main trunk) 4 to a second end station 5 on another land mass 6. At some point along the length of the main trunk 4 there is provided a branching unit 7 having a spur 8 to a third endstation 9 on yet another land mass 10. The branching unit 7 is configured to allow a number of channels of different wavelengths of a WDM signal carried by the main trunk 4 which appears at a trunk input 11 of the branching unit 7 to be coupled to a spur output 12 for onward transmission to the third endstation 9. Likewise, any channels transmitted by the third endstation 9 which are received at a spur input 13 of the branching unit 7 are coupled to a main trunk output 14 for onward transmission. The branching unit 7 includes all the optical devices to facilitate the necessary demultiplexing, drop, add and multiplexing operations. As will be described below, a branching unit in accordance with the present invention permits wavelength and/or capacity reconfiguration between the main trunk 4 and the spur 8.

FIG. 2 shows a simplified example of a branching unit 7 in accordance with the present invention. The branching unit 7 comprises an arrayed-waveguide grating (AWG) 15 and an optical switch 16. A WDM signal received at the trunk input 11 from the main trunk 4 enters the centre port 17 of the AWG 15 and as it proceeds it is demultiplexed into individual channels. These channels are routed into the 8×8 optical switch (cross-connect) 16. Depending on the state of the optical switch 16, each channel is then either dropped or returned to the main trunk. If the optical switch 16 is in the cross state the channel will be routed to a respective input of an optical multiplexer 18, and thus to the spur output 12. If the optical switch 16 is in the bar or through state the channel will be routed via a loop-back path to the respective input of the AWG 15. As the signals proceed through the AWG 15 they are remultiplexed and exit via the trunk output 14 for onward transmission on the main trunk 4. The signals return from the spur 8 via the spur input 13 and are demultiplexed by a demultiplexer 19 before entering the optical switch 16. If the optical switch 16 is in the cross state for these channels they will be routed to a respective input of the AWG 15 where they will be remultiplexed before joining the main signal on the main trunk 4 via the trunk output 14. The size of the AWG 15 and the optical switch 16 can be selected as required to accommodate any number of channels.

Control of the state of the optical switch 16 is carried out at a network management (administration) level from one of the endstations using optical signals carried by the submarine cable.

As the WDM signal carried by the main trunk 4 is demultiplexed at the branching unit 7, specific channels can be processed as required. In particular, the branching unit 7 allows wavelengths or capacity reconfiguration between the main trunk and spur so that it is possible to disconnect a signal from the spur or increase the capacity of the spur according to the customers changing requirements. The configuration also allows attenuation/gain filtering, wavelength conversion, dispersion compensation or other types of optical signal processing of individual channels to be accomplished in the main trunk and in the spur.

What is claimed is:

1. A branching unit for an underwater optical communications system, comprising an optical switch and an optical multiplexer, the optical multiplexer having a plurality of loop-back optical paths which separately pass from the multiplexer and through the optical switch, wherein the optical switch is reconfigurable by changing the state of the optical switch so that individual channels of a multichannel optical signal received at a trunk input of the branching unit can be selectively coupled to a spur output and optical channels of a signal received at a spur input of the branching unit can be selectively coupled to a trunk output.

2. A branching unit according to claim 1, further comprising a demultiplexer in a spur input path coupled to the optical switch for demultiplexing an optical signal from the spur input and directing individual channels to a respective input port of the optical switch.

3. A branching unit according to claim 1, further comprising a multiplexer in a spur output path coupled to the optical switch for combining individual channels from respective output ports of the optical switch and coupling the resultant multiplexed optical signal to the spur output.

4. A branching unit according to claim 1, in which the optical switch is a 2n×2n optical switch, where n is the number of possible channels in a WDM optical signal to be carried by the communications system.

5. A branching unit according to claim 1, in which the optical multiplexer comprises an arrayed-waveguide multiplexer.

6. A communications system comprising a plurality of branching units in accordance with claim 1.

* * * * *